Patented Apr. 1, 1947

2,418,318

UNITED STATES PATENT OFFICE 2,418,318

PROCESS FOR THE PREPARATION OF BZ1-CHLOROBENZANTHRONE

Mario Scalera, Somerville, N. J., assignor to American Cyanamid Company, New York, N. Y., a corporation of Maine No Drawing. Application March 23, 1944, Serial No. 527,846

3 Claims. (Cl. 260—364)

This invention relates to a process of producing chlorine derivatives of benzanthrone.

Chlorinated derivatives of benzanthrone are important intermediates in the preparation of vat dyestuffs, particularly isoviolanthrone. In the past chlorination of benzanthrone has been carried out in aqueous media or in organic solvent such as chlorobenzene or nitrobenzene, or in concentrated sulfuric acid. In each case the first product of chlorination is stated to be a bz1-halobenzanthrone of the formula:

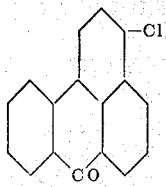

While this product is in fact produced by the processes of the prior art, it is not the only product obtained. Thus in the chlorination of benzanthrone in aqueous suspension, a mixture of mono- and dichlorinated benzanthrones, and also oxidation products, are obtained. Chlorination in concentrated sulfuric acid results in the production of large amounts of dichlorinated products even when the chlorination is stopped before the theoretical amount of chlorine has been absorbed. Even under careful control products are obtained which are contaminated with unchlorinated benzanthrone, isomeric monochlorinated benzanthrones and polychlorinated products, and in general not more than 50% of the reaction product is the desired bz1-chlorobenzanthrone.

More recently somewhat better results have been reported in a proposed process in which the chlorination takes place in sulfuric acid of 63–65% strength. While this procedure results in improvement in quality of the final product, serious disadvantages result by reason of operating difficulties. In the first place the range of concentration is very narrow and quite critical. The medium is corrosive and requires special acid resistant equipment, and the control of the end point of chlorination requires great care in order to avoid producing the dichlorinated product.

According to the present invention, we have found that chlorinated benzanthrones of high purity are obtainable by subjecting a solution of benzanthrone in concentrated phosphoric acid of 85–100%, preferably 90–95% strength, to the action of chlorine gas.

It is an advantage of the present invention that relatively low temperatures may be used, the preferable range being from 50–70° C. A further advantage lies in the relatively short time cycle required. Probably the most important advantage of the present invention is due to the fact that, while the first atom of chlorine enters the benzanthrone molecule readily, further chlorination is extremely slow so that completion of the reaction can be readily determined by slowing down in the rate of chlorine absorption and production of polychlorinated products is easily avoided. This behaviour is in marked contrast to the reaction in water, concentrated sulfuric acid, or organic solvents, where it is an extremely difficult matter to interrupt the chlorination at the right point.

It is not desired to limit the present invention to any theory of action. I believe, however, that an important factor in the improved results may be due to the presence of the benzanthrone in the phosphoric acid in the form of the appreciably soluble oxonium phosphate which is red in color, whereas the monochlorinated benzanthrone is present as the yellow little soluble free ketone. Presumably in phosphoric acid the reaction with the oxonium compound is much more rapid than with the ketone.

The final reaction products are of good purity and their chlorine content is very close to the theoretical for the monochlorinated benzanthrone and changes but little on recrystallization. It is possible to produce by the present method in high yield a bz1-chlorobenzanthrone which is well suited for conversion to isoviolanthrone. It is also sufficiently pure to react with alpha-amino anthraquinones to give products which on fusion yield important green benzanthrone anthraquinone acridine vat dyestuffs.

It is an advantage of the present invention that the reaction products can be easily recovered in a fairly pure form by pouring the reaction mass into water or by filtering off the phosphoric acid from the suspension. In the latter case the recovery results in some purification, and in either case the yields are close to the theoretical. The phosphoric acid may be recovered by diluting, filtering off any organic matter present and then evaporating to the desired strength.

The invention will be described in greater detail in conjunction with the following specific examples, the parts being by weight.

Example 1

46 parts of pure benzanthrone are slurried in 460 parts of concentrated phosphoric acid of approximately 92% strength. A blood red, thin slurry of oxonium salt is obtained and a stream of chlorine gas is introduced in finely divided form, preferably by the use of a porous Carborundum block or similar device to insure small gas bubbles. The reaction mixture is maintained at 60–65° C.

The chlorine absorption is very rapid at first but after one mole has been absorbed, which takes some hours, the absorption tapers off. It is continued for a short time until the red color of the slurry gradually gives place to the gold yellow color of the suspension of bz1-chlorobenzanthrone. Chlorine introduction is then stopped, the solution filtered, and the precipitate washed with hot water until neutral. In order to remove all of the acid the filter presscake may be reslurried in 600 parts of water which is made alkaline to phenolphthalein with a small amount of soda ash. After neutralization the suspension is again filtered and washed free of alkali.

An excellent yield of bz1-chlorobenzanthrone is obtained which has a chlorine content between 13.0–13.8% depending on time of chlorination (the theoretical chlorine content for bz1-chlorobenzanthrone is 13.4%).

*Example 2*

46 parts of technical benzanthrone (85–95% pure) are slurried in 460 parts of phosphoric acid of 92–95% strength. A thin suspension of the red oxonium salt results and a jet of chlorine gas in very fine bubbles is passed through at a temperature of 60–65° C.

The red slurry turns to greenish-yellow color and the chlorine input is maintained until the theoretical quantity is absorbed, or until absorption becomes very slow, which occurs at the same time, and chlorine addition is continued for a short time thereafter until there is no further color change.

The slurry is filtered in a filter press, washed with hot water, the greenish presscake reslurried in water, made alkaline, boiled, filtered, and washed free of alkali.

The precipitate is dried and is a technically pure bz1-chlorobenzanthrone which is suitable for many dyestuffs. If a purer product is desired it may be obtained by recrystallization from glacial acetic acid.

The concentrated phosphoric acid filtrate is mixed with the first aqueous wash, filtered (preferably in the presence of some decolorizing charcoal), and again concentrated to a specific gravity of 1.80–1.85, after which it cay be reused without further purification.

I claim:

1. A method of chlorinating benzanthrone which comprises subjecting a dispersion of the benzanthrone in phosphoric acid of 85–100% strength to the action of chlorine gas.

2. A method of chlorinating benzanthrone which comprises subjecting a dispersion of the benzanthrone in phosphoric acid of 90–95% strength to the action of chlorine gas.

3. A method of producing bz1-chlorobenzanthrone which comprises subjecting to the action of chlorine gas a dispersion of benzanthrone in phosphoric acid of 85–100% strength until the red oxonium phosphate has been transformed into the chlorobenzanthrone.

MARIO SCALERA.

REFERENCES CITED

The following references are of record in the file of this patent:

UNITED STATES PATENTS

| Number | Name | Date |
|---|---|---|
| 1,851,019 | Murch | Mar. 29, 1932 |
| 1,868,608 | Kunz | July 26, 1932 |

FOREIGN PATENTS

| Number | Country | Date |
|---|---|---|
| 441,041 | British | Jan. 10, 1936 |